(12) United States Patent
Hirst et al.

(10) Patent No.: US 8,725,764 B2
(45) Date of Patent: *May 13, 2014

(54) METHOD AND APPARATUS FOR SEARCHING MESSAGE DATA IN A PORTABLE ELECTRONIC DEVICE

(71) Applicant: BlackBerry Limited, Waterloo (CA)

(72) Inventors: David Matthew Hirst, Andover, MA (US); Yevgeniy Motov, Brighton, MA (US); Jennifer Ignacz, Waterloo (CA); David Bukurak, Ottawa (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/787,567

(22) Filed: Mar. 6, 2013

(65) Prior Publication Data

US 2013/0185290 A1    Jul. 18, 2013

Related U.S. Application Data

(63) Continuation of application No. 12/870,283, filed on Aug. 27, 2010, now Pat. No. 8,423,570.

(60) Provisional application No. 61/326,314, filed on Apr. 21, 2010.

(51) Int. Cl.
    *G06F 17/30* (2006.01)
(52) U.S. Cl.
    CPC .................. *G06F 17/30017* (2013.01)
    USPC ............................... 707/769; 707/804
(58) Field of Classification Search
    USPC ............... 707/758, 769, 770, 804; 709/206; 455/421.1, 466
    See application file for complete search history.

(56) References Cited

U.S. PATENT DOCUMENTS

| | | |
|---|---|---|
| 7,885,641 B2 | 2/2011 | Tysowski |
| 2005/0149621 A1 | 7/2005 | Kirkland et al. |
| 2006/0075029 A1* | 4/2006 | Kelso et al. .................. 709/206 |
| 2006/0248151 A1 | 11/2006 | Belakovskiy |
| 2007/0038707 A1* | 2/2007 | Broder et al. ................. 709/206 |

(Continued)

FOREIGN PATENT DOCUMENTS

| | | |
|---|---|---|
| EP | 0886228 A2 | 12/1998 |
| EP | 2144411 A1 | 1/2010 |

OTHER PUBLICATIONS

Koster et al., Using message-based threading for multimedia applications, Aug. 22-25, 2001, IEEE, 599-602.*

(Continued)

*Primary Examiner* — Jean B Fleurantin
(74) *Attorney, Agent, or Firm* — Novak Druce Connolly Bove + Quigg LLP

(57) ABSTRACT

A method and apparatus for searching message data in a portable electronic device are provided. A threaded message inbox is provided at a display of the device, the message data grouped as threads. Search criteria are received and a search of an index of the threaded message inbox is initiated using the search criteria, the index comprising key words extracted from the message data. Additional message data is received while the search is being performed, the additional message data belonging to a given thread. Additional message data is searched in addition to the index. Search results are generated based on whether at least one of data from additional message data and data from the index meets the search criteria. Search results are provided in threads at the display. Search results are automatically updated in response to receiving additional message data when the additional message data meets the search criteria.

15 Claims, 9 Drawing Sheets

(56) References Cited

U.S. PATENT DOCUMENTS

2008/0311935 A1  12/2008  Tysowski
2012/0265753 A1* 10/2012  Bocking et al. ............... 707/722

OTHER PUBLICATIONS

Lindemann, et al. ; A distributed search service for peer-to-peer file sharing in mobile applications; Proceedings of the Second International Conference on Peer to Peer Computing, 2002, IEEE, 73-80.

Google—"Gmail Help: Get Mail from other Accounts", http://mail.google.com/support/bin/answer.py?&answer=21288; updated Oct. 14, 2009.

Google—"Gmail Help: Conversations", http://mail.google.com/support/bin/answer.py?hl=en&answer=5900; updated May 21, 2010.

Extended European search report mailed Feb. 8, 2011, in corresponding European patent application No. 10174304.5.

* cited by examiner

METHOD AND APPARATUS FOR SEARCHING MESSAGE DATA IN A PORTABLE ELECTRONIC DEVICE

RELATED APPLICATION

This application is a continuation of U.S. patent application Ser. No. 12/870,283 filed on Aug. 27, 2010, which claims the benefit of U.S. Provisional Patent Application Ser. No. 61/326,314 filed Apr. 21, 2010, the entire contents of each application are hereby incorporated by reference herein for all purposes.

FIELD

The specification relates generally to portable electronic devices, and specifically to a method and apparatus for searching message data in a portable electronic device.

BACKGROUND

At a portable electronic device, technology for searching messages and providing results is currently limited due to the limited size of the display screen.

BRIEF DESCRIPTIONS OF THE DRAWINGS

Implementations are described with reference to the following figures, in which.

DETAILED DESCRIPTION OF THE IMPLEMENTATIONS

Figure 1:
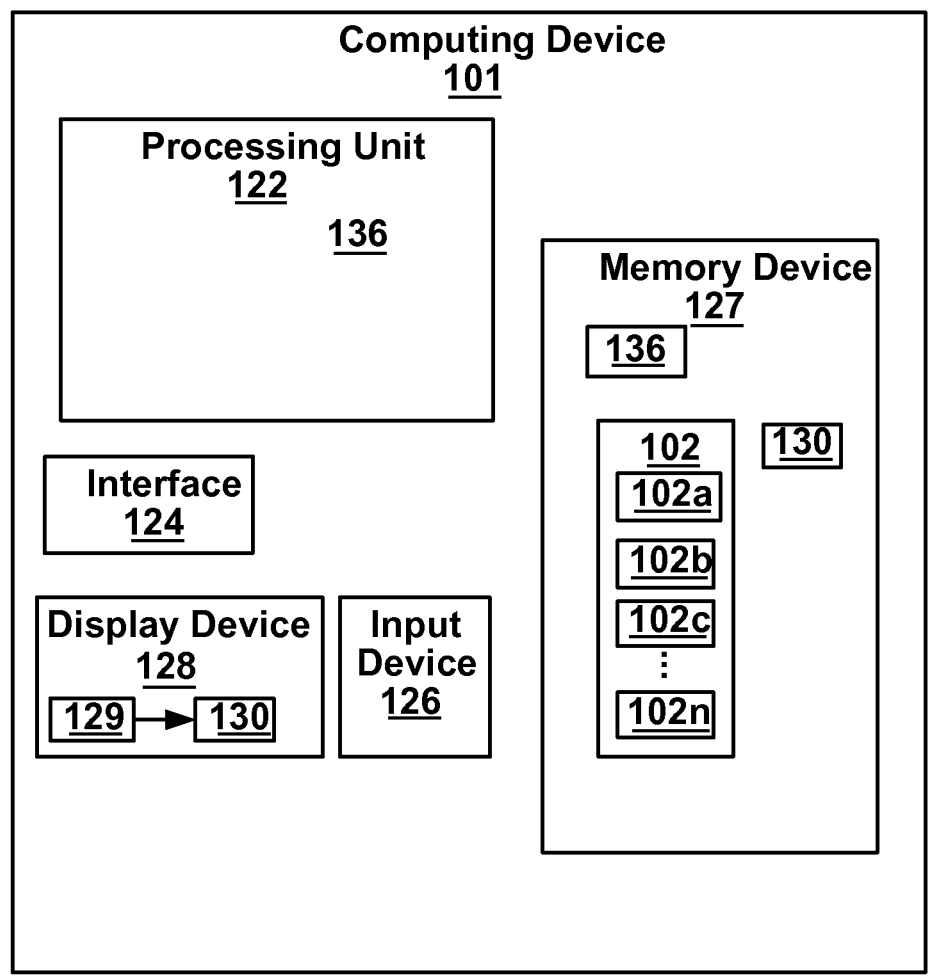
FIG. 1 depicts a block diagram of a portable electronic device for searching messages, according to non-limiting implementations.

A first aspect of the present specification provides a method for searching message data in a portable electronic device comprising a processing unit interconnected with a memory device, a display device and a communication interface. The method comprises: providing a threaded message inbox, at the display device, the threaded message inbox comprising the message data grouped as threads; receiving search criteria, at the processing unit, for searching the threaded message inbox; initiating a search of an index of the threaded message inbox, at the processing unit, using the search criteria, the index comprising key words extracted from the message data and stored in the memory device; receiving additional message data belonging to a given thread, via the communication interface, while the search is being performed; searching the additional message data in addition to the index; generating search results based on whether at least one of data from the additional message data and data from the index meets the search criteria; and providing the search results in threads at the display device. The search results are automatically updated in response to receiving the additional message data when the additional message data meets the search criteria.

Providing the search results can comprise providing the additional message data in the given thread. The given thread can further comprise at least one further set of message data associated with the given thread.

Each of the threads in the search results can comprise only message data associated with the search results.

Each of the threads in the search results can comprise all message data associated with each respective thread, regardless of whether each message in each respective thread is associated with the search results.

The method can further comprise providing respective graphic icons for each of the threads in the search results, each the respective graphic icon indicative of whether an associated thread comprises one message or a plurality of messages.

The method can further comprise providing respective textual indicators for each of the threads in the search results, each the respective textual indicator indicative of a total number of messages in each respective thread and at least one of a number of unopened messages and a number of messages associated in each respective thread.

The search can be initiated when a first character is received in the receiving search criteria.

The method can further comprise providing search options at the display device in association with the receiving the search criteria, the search options comprising options for searching given fields of the message data and wherein the search results comprise only data that meets the search criteria in chosen fields of the message data.

A second aspect of the present specification provides a portable electronic device for searching message data. The portable electronic device comprises a processing unit interconnected with a memory device, a display device and a communication interface. The processing unit is enabled to: provide a threaded message inbox, at the display device, the threaded message inbox comprising the message data grouped as threads; receive search criteria, at the processing unit, for searching the threaded message inbox; initiate a search of an index of the threaded message inbox, at the processing unit, using the search criteria, the index comprising key words extracted from the message data and stored in the memory device; receive additional message data belonging to a given thread, via the communication interface, while the search is being performed; search the additional message data in addition to the index; generate search results based on whether at least one of data from the additional message data and data from the index meets the search criteria; and provide the search results in threads at the display device. The search results are automatically updated in response to receiving the additional message data when the additional message data meets the search criteria.

To provide the search results the processing unit can be further enabled to provide the additional message data in the given thread. The given thread can further comprise at least one further set of message data associated with the given thread.

Each of the threads in the search results can comprise only message data associated with the search results.

Each of the threads in the search results can comprise all message data associated with each respective thread, regardless of whether each message in each respective thread is associated with the search results.

The processing unit can be further enabled to provide respective graphic icons for each of the threads in the search results, each the respective graphic icon indicative of whether an associated thread comprises one message or a plurality of messages.

The processing unit can be further enabled to provide respective textual indicators for each of the threads in the search results, each the respective textual indicator indicative of a total number of messages in each respective thread and at least one of a number of unopened messages and a number of messages associated in each respective thread.

The search can be initiated when a first character is received in the receiving search criteria.

The processing unit can be further enabled to provide search options at the display device in association with the receiving the search criteria, the search options comprising options for searching given fields of the message data and wherein the search results comprise only data that meets the search criteria in chosen fields of the message data.

A third aspect of the present specification provides a computer program product, comprising a computer usable medium having a computer readable program code adapted to be executed to implement a method for for searching message data in a portable electronic device comprising a processing unit interconnected with a memory device, a display device and a communication interface, comprising: providing a threaded message inbox, at the display device, the threaded message inbox comprising the message data grouped as threads; receiving search criteria, at the processing unit, for searching the threaded message inbox; initiating a search of an index of the threaded message inbox, at the processing unit, using the search criteria, the index comprising key words extracted from the message data and stored in the memory device; receiving additional message data belonging to a given thread, via the communication interface, while the search is being performed; searching the additional message data in addition to the index; generating search results based on whether at least one of data from the additional message data and data from the index meets the search criteria; and providing the search results in threads at the display device.

FIG. 1 depicts a portable electronic device 101 for searching message data 102, according to non-limiting implementations. Portable electronic device 101, which will also be referred to hereafter as device 101, comprises a processing unit 122 interconnected with a communication interface 124, an input device 126, a memory device 127, and a display device 128, for example via a computing bus (not depicted). It is appreciated that message data 102 comprises any suitable number of sets of message data 102a, 102b, 102c, ... 102n (collectively message data 102, and generically a set of message data 102), wherein each set of message data 102 comprises data received in messages received via communications interface 124 (e.g. e-mail or the like). Furthermore, message data 102 can be grouped into threads: e.g. a first set of message data 102 can comprise a first message, while additional sets of message data 102 can comprise replies and/or responses to replies and/or further messages in the thread. Whether or not a given set of message data 102 is in a given thread can be determined using any suitable method, including but not limited to a subject field of a message being similar to other subject fields in previous messages. Memory device 127 further stores an index 130 of message data 102, index 130 comprising keywords associated with each set of message data 102, each keyword extracted from message data 102 and associated with each set of message data 102 as extracted.

Device 101 can further comprise a searching application 136 for searching message data 102 and/or index 130. Application 136 can be stored in memory device 127 and processed by processing unit 122. In particular processing of application 136 enables device 101 to search message data 102 and/or index 130 and to control display device 128 to provide search results in threads, as will be described below.

In general, device 101 comprises any suitable portable electronic device for processing application 136, including but not limited to any suitable combination of, laptop computing devices, portable computing device, mobile electronic devices, PDAs (personal digital assistants), cellphones, smartphones and the like. Other suitable portable electronic devices are within the scope of present implementations.

Processing unit 122 comprises any suitable processor, or combination of processors, including but not limited to a microprocessor, a central processing unit (CPU) and the like. Other suitable processing units are within the scope of present implementations.

Communication interface 124 comprises any suitable communication interface, or combination of communication interfaces. In particular communication interface 124 is enabled to communicate with remote computing devices via a network (not depicted) to receive message data 102, the network being wired and/or wireless as desired. Accordingly, communication interface 124 (—which will also be referred to as interface 124 hereinafter—) is enabled to communicate according to any suitable protocol which is compatible with the network, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, interface 124 can be enabled to communicate with remote computing devices (e.g. servers, other computing devices, other mobile electronic devices, etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Input device 126 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Memory device 127 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory device 127 is enabled to store application 136, message data 102, and index 130.

Display device 128 comprises circuitry 129 for generating representations of data, for example a representation 130 of application 136, as will be described below. Display device 128 can include any suitable one or of combination of CRT (cathode ray tube) and/or flat panel displays (e.g. LCD (liquid crystal display), plasma, OLED (organic light emitting diode), capacitive or resistive touchscreens, and the like). Circuitry 129 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 129 can be controlled by processing unit 122 to generate representation 130.

In particular, attention is directed to FIG. 2 which depicts non-limiting implementations of display device 128 and circuitry 129, in communication with processing unit 122 and a memory cache 227 (hereinafter cache 227). In some implementations, memory device 127 can comprise cache 227, while in other implementations cache 227 can comprise a separate memory device. Furthermore, processing unit 122 is in communication with cache 227 and further enabled to control circuitry 129. In particular, processing unit 122 is enabled to control an area 230 of circuitry 129 to provide search results from a search on message data 102 and/or index 130 in threads, as will be described below.

Figure 2:
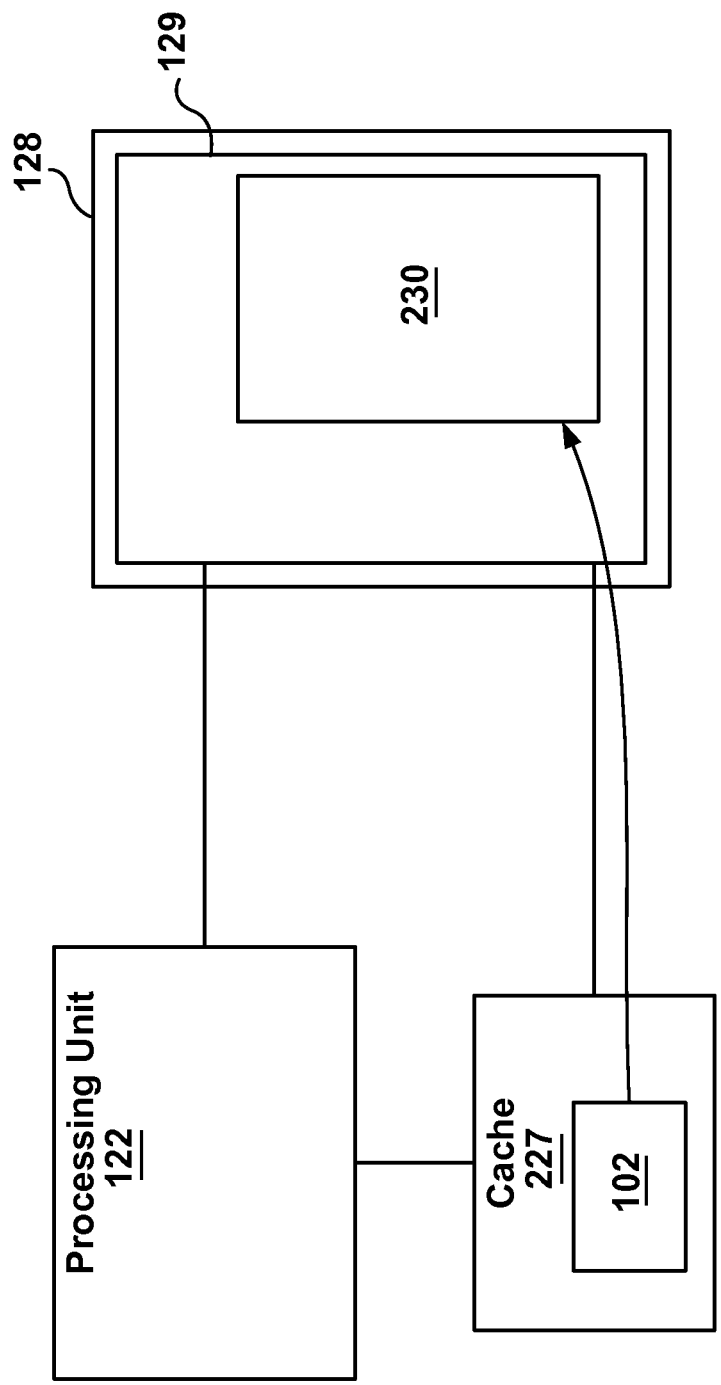
FIG. 2 depicts a block diagram of elements of the portable electronic device of FIG. 1 for controlling a display device, according to non-limiting implementations.

In implementations depicted in FIG. 2, it is appreciated that circuitry 129 and area 230 comprises, for example, transistors in a flat panel display, however in other implementations, circuitry 129 can comprise a combination of an electron gun in a CRT, and area 230 can comprise phosphors in a CRT.

Furthermore, it is appreciated that display device 128 can have an area that is commensurate with device 101 being mobile, and hence display device 128 is smaller than display devices on, for example, personal computers. Hence, efficiently using cache 227 to provide search results, and further efficiently controlling display device 128 to provide search results, become significant technical problems which can be addressed as described below.

Figure 3:
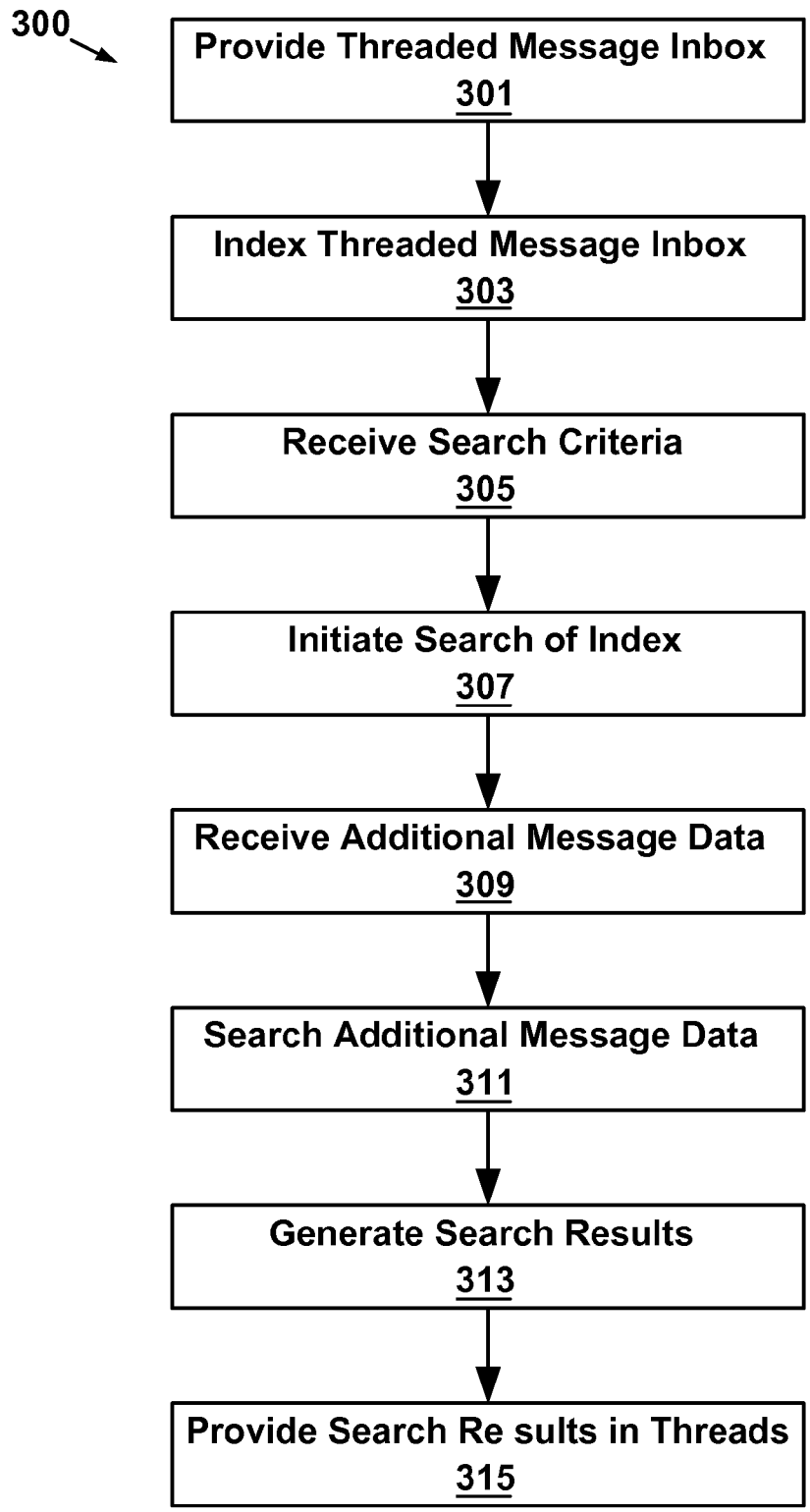
FIG. 3 depicts a flowchart of a method for searching messages in a portable electronic device, according to non-limiting implementations.

Attention is now directed to FIG. 3 which depicts a method 300 for searching message data in a portable electronic device. In order to assist in the explanation of method 300, it will be assumed that method 300 is performed using device 101. Furthermore, the following discussion of method 300 will lead to a further understanding of device 101 and its various components. However, it is to be appreciated that device 101 and/or method 300 can be varied, and need not work exactly as discussed herein in conjunction with each other, and that such variations are within the scope of present implementations.

In method 300, it is assumed that memory device 127 stores message data 102 that has previously been received via interface 124 and a communication network (not depicted), for example as e-mail messages.

Figure 4:
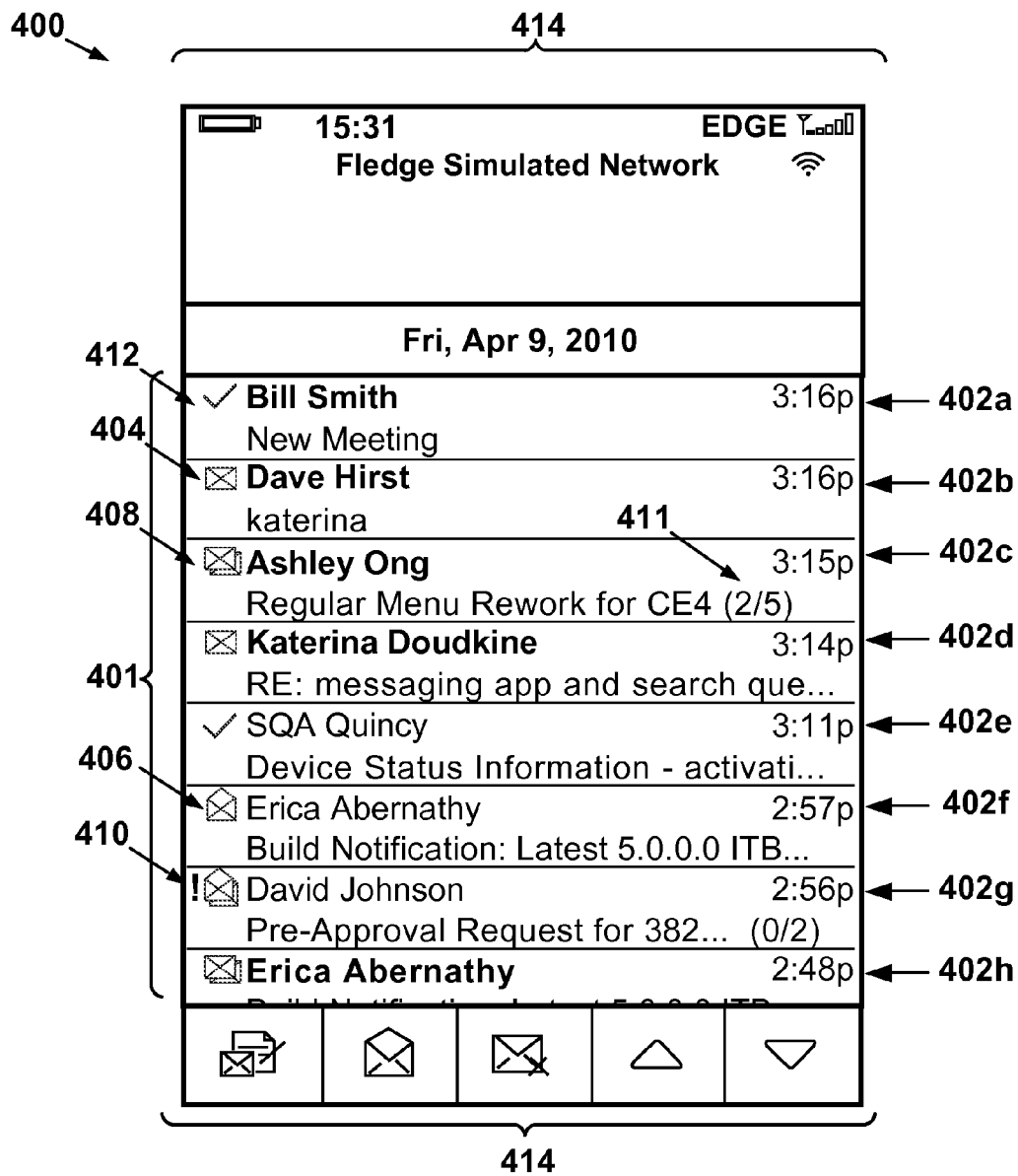
FIG. 4 depicts a representation of a threaded unified inbox of the portable electronic device of FIG. 1, according to non-limiting implementations.

At step 301, a threaded message inbox is provided at display device 128, threaded message inbox comprising message data grouped as threads. For example, processing unit 122 can be caused to process application 136, which in turn causes processing unit 122 to control display device 128 to provide a representation 400 comprising a threaded message inbox 401 as depicted in FIG. 4, according to non-limiting implementations. As appreciated from FIG. 4, threaded message inbox 401 (referred to hereafter as inbox 401), comprises a plurality of fields 402a, 402b, 402c, 402d, 402e, 402f, 402g, and 402h (collectively lines 402, and generically field 402) each field 402 corresponding to a message thread, each thread comprising at least one set of message data 102. Threads with only one message therein can be indicated using at least one suitable icon 404, 406 which, in depicted non-limiting implementations, can comprise a single "closed" envelope (e.g. icon 404), when the associated message has not been opened, or a single "open" envelope (e.g. icon 406), when the associated message has been opened. Similarly, threads with more than one message therein can be indicated using at least one suitable icon 408, 410 which, in depicted non-limiting implementations, can comprise more than one "closed" envelopes (e.g. icon 408), when at least one associated message in the thread has not been opened, or a more than "open" envelopes (e.g. icon 410), when all the associated messages in the thread have been opened. It is appreciated that icon 410 includes an optional "exclamation point" sub-icon indicative of at least one message in the thread being of a high priority. It is appreciated that display device 128 can be controlled to provide the thread when input data is received from input device 126 indicating that the thread is to be opened (e.g. a pointer can be used to select a given thread).

Furthermore, in depicted implementations, an indication of a number of messages in a thread and/or the number of unopened messages in a thread (or conversely the number of read messages in a thread) can be provided in an indicator 411: for example, in the indicator 411 of field 402c, there are 5 messages in the associated thread, 2 of which are unopened (e.g. "⅖").

Furthermore, in these implementations, inbox 401 comprises a unified inbox in which all messages stored in device 101 are provided. Specifically, inbox 401 comprises both received messages as well as sent messages: for example, field 402a corresponds to a message sent from device 101 to another computing device via interface 124 and/or a communication network (not depicted), as indicated by icon 412. Furthermore, in some implementations, device 101 can be associated with more than one messaging account (for example a business related messaging account and a personal messaging account); in these implementations, the unified inbox comprises messages from all accounts associated with device 101. The unified inbox can further comprise draft messages, outgoing messages and/or any other suitable type of message that could be in a unified inbox, including but not limited to SMS (short message service) messages, IM (instant messaging) messages and call log events. Furthermore, email, SMS, IM, etc. are all classes of message that can make use of the present implementations.

Representation 300 can also comprise various icons and/or indicators 414 which can indicate battery strength, charging of battery, time, date, whether or not device 101 is in communication with a communication network, signal strength, a number of new messages in message data 102, and/or actions that can be initiated at device 101 upon actuation of an icon (e.g. compose a new message, open a message, delete a message, scrolling or the like) or the like.

Returning to FIG. 3, at step 303 the threaded message inbox is indexed at processing unit 122, by extracting key words from message data 102 and storing key words in index 130 in memory device 127. It is appreciated that step 303 can occur any suitable number of times, for example, when device 101 is turned on and/or first provisioned. It is further appreciated that as each set of message data 102 is received at device 101, each new set of message data 102 is indexed and the resulting keywords stored in index 130. It is further appreciated that index 130 can comprise the keywords, for example a different set of keywords for each set of message data 102, with the keywords associated with respective message data 102 (e.g. indicators and/or identifiers of respective message data 102 and/or pointers to respective message data 102).

Furthermore, any suitable method can be used to extract keywords from message data 102, including but not limited to, extracting data from a subject line, extracting data from a sender line, extracting data from a receiver line and/or extracting data from a body of a set of message data 102.

Figure 5:
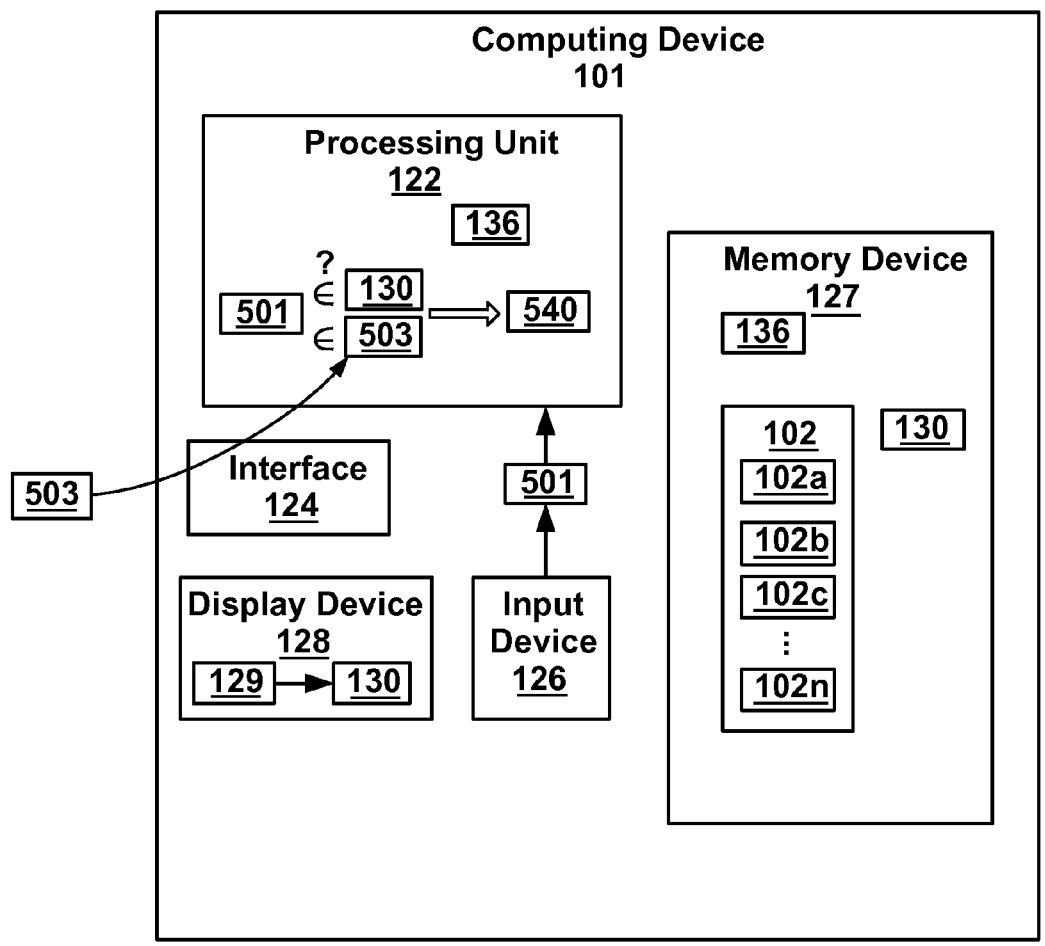
FIG. 5 depicts a block diagram of a portable electronic device for searching messages, according to non-limiting implementations.
Figure 6:
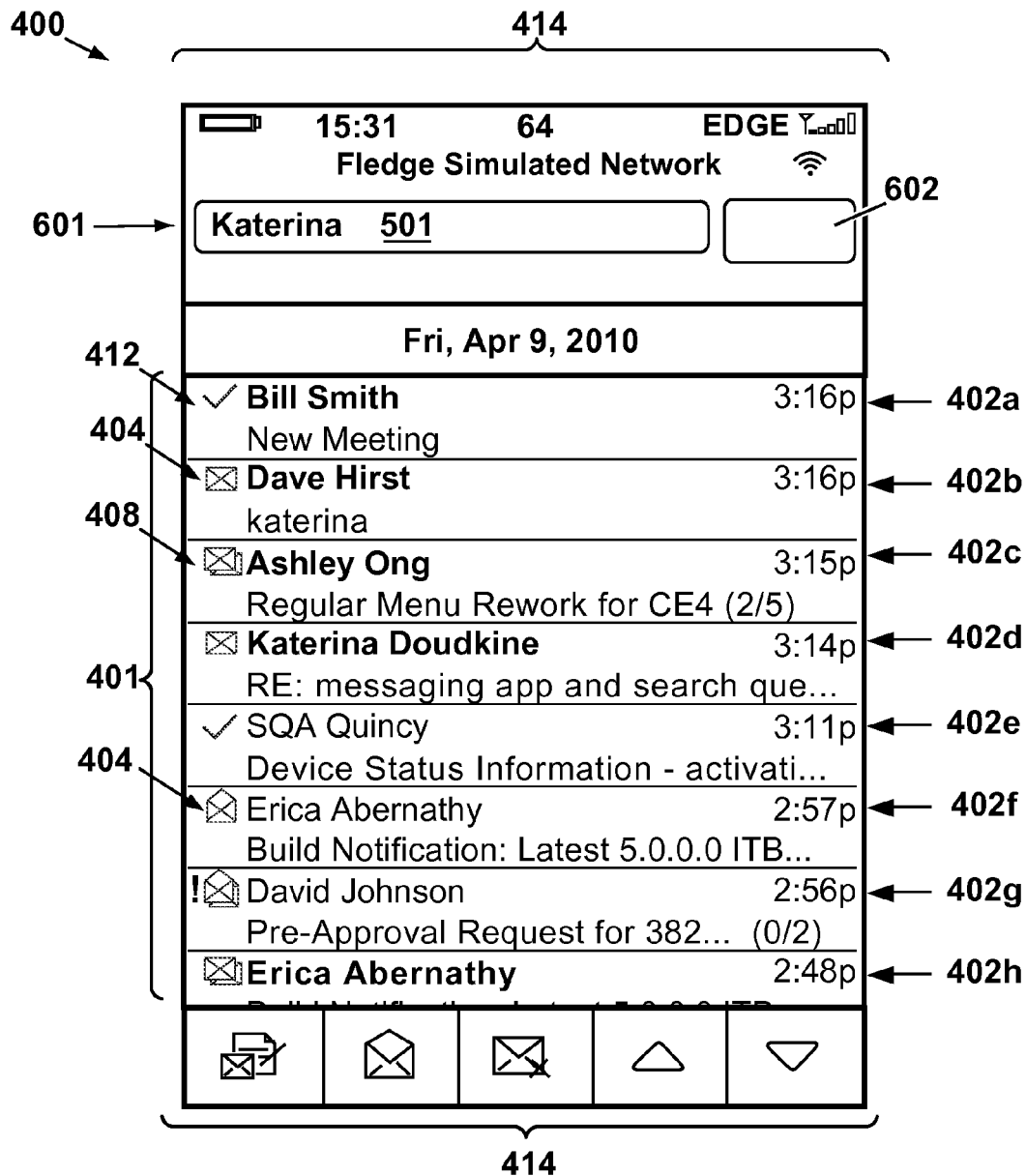
FIG. 6 depicts a representation of a search field in the threaded unified inbox of FIG. 4, according to non-limiting implementations.
Figure 7:
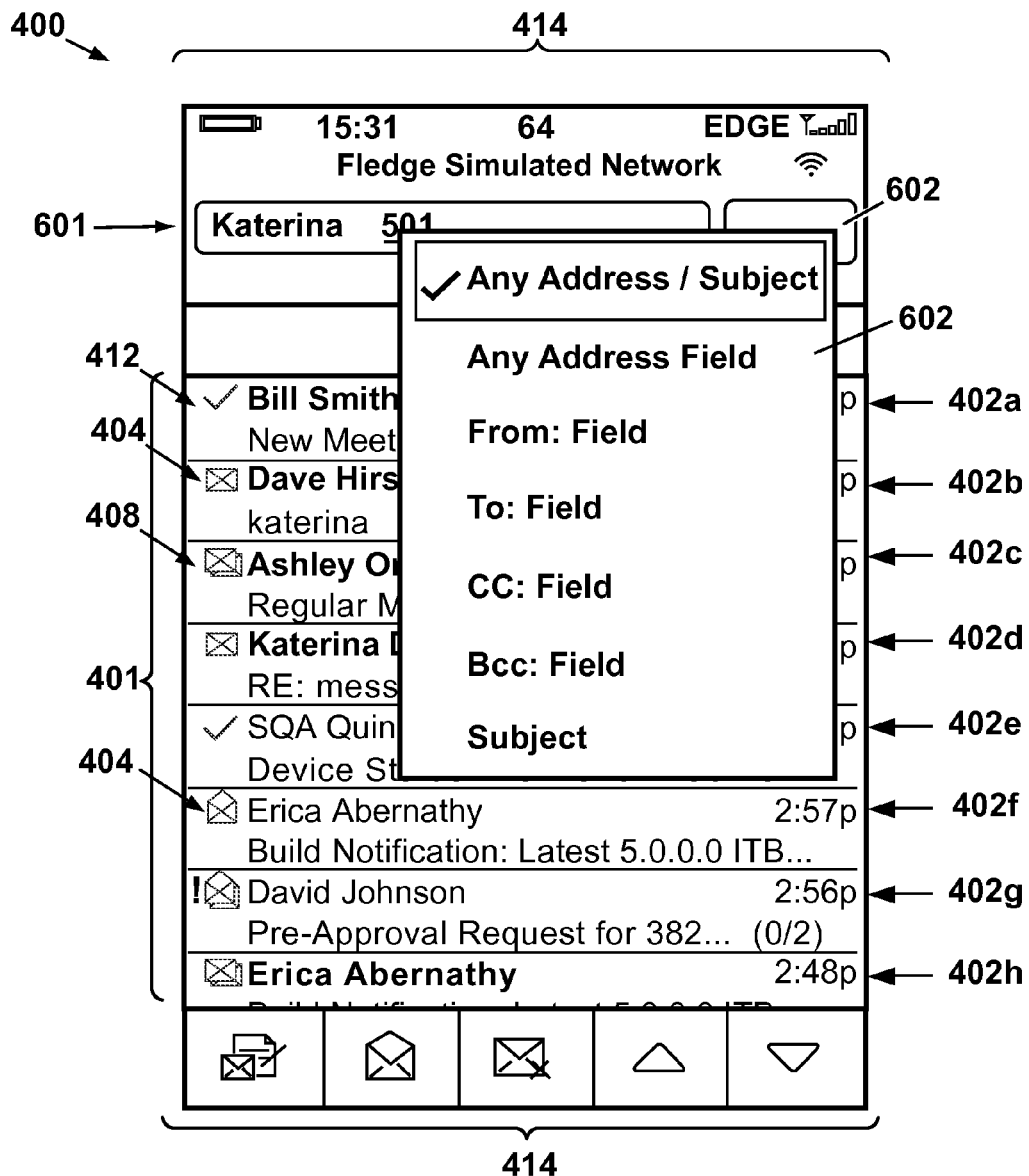
FIG. 7 depicts a representation of search options in the threaded unified inbox of FIG. 6, according to non-limiting implementations.

At step 305, and with reference to FIG. 5, search criteria 501 is received at processing unit 122, search criteria 501 for searching the threaded message inbox. FIG. 5 is substantially similar to FIG. 1, with like elements having like numbers. In any event, search criteria can be received via input device 126, for example via a search field 601 depicted in FIG. 6, which is substantially similar to FIG. 4, with like elements having like numbers, however display device 128 and/or circuitry 129 has been controlled to provide search field 601 wherein search criteria 501 can be received (e.g. the text "katerina"). In some implementations, search field 601 can include a virtual button 602 that, when actuated (e.g. via receipt of input data at input device 126), causes processing unit 122 to providing search options, for example in the form of a pull down menu 701 (as depicted in FIG. 7, substantially similar to FIG. 6, with like elements having like numbers), at display device 128, pull down menu 701 comprising options for searching given fields of message data 102 as indexed in index 130. Search results 540, as described below, can then comprise only data that meets search criteria 501 in chosen fields of message data 102, as determined by selections from pulldown menu 701. Selection of search options is not limited to a pull-down menu however, and search options for selection can be provided using any suitable method.

Again returning to FIG. 3, at step 307, a search of index 130 is initiated at processing unit 122 using search criteria 501, for example by comparing search criteria to keywords in index 130 and/or any other suitable method. The search is represented in FIG. 5 with processing unit 122 determining whether search criteria 501 is an element of index 130. Furthermore, in some implementations, the search can be initiated when a first character is received in field 601, and refined with each successive character received.

At step 309, and as depicted in FIG. 5, an additional message data 503 is received while the search of step 307 is being performed. Additional message data 503 is received via interface 124 and/or a communication network (not depicted), additional message data 503 belonging to a given thread in threaded message inbox 401.

At step 311, additional message data 503 is searched in addition to index 130 as part of the search initiated at step 307. The search of additional message data 503 can occur when additional message data 503 is received, after the search of index 130 is complete, or at any other suitable time during the search. Furthermore the search of additional message data 503 can comprise searching any suitable field and/or data in additional message data 503 to determine if search criteria 501 is an element of additional message data 503. Furthermore, additional message data 503 can comprise one or more messages received during the search initiated at step 307.

At step 313, search results 540 are generated, as depicted in FIG. 5, based on whether at least one of data from additional message data 503 and data from index 130 meets search criteria 501. Search results 540 can be compiled as each occurrence of search criteria 501 is found in index 130 and/or additional message data 503, and provide in a representation 800 as depicted in FIG. 8, described below.

At step 315, search results 540 are provided in threads at display device 128. For example, attention is directed to FIG. 8 which depicts representation 800 of search results 540, search results 540 comprising fields 802a, 802b, 802c....802h (collectively fields 802 and generically a field 802), each field corresponding to a thread comprising messages that meet search criteria 501. Furthermore, it is appreciated that messages in threads corresponding to fields 802a and 802b arrived while the search was being performed, and hence these messages were searched in addition to index 130. For example, comparing FIG. 8 with FIG. 4, it is appreciated that in FIG. 4 the thread corresponding to field 402b comprises one message, while in FIG. 8, the same thread in search results 540 (corresponding to field 802b) comprises two messages, neither of which have been opened; it is appreciated that the two messages meet search criteria 501. It is further appreciated from FIG. 8 that another message, corresponding to field 802a, that met search criteria 501 arrived while the search was being conducted and hence is provided in search results 540. Other messages may have arrived during the search which do not meet search criteria 501; while these messages are also searched, they are not provided in representation 800.

It is further appreciated that providing search results 540 comprises providing additional message data 503 in an associated given thread in search results 540, as in field 802b; in other words, additional message message data 503 is provided in the thread to which it belongs.

Figure 8:
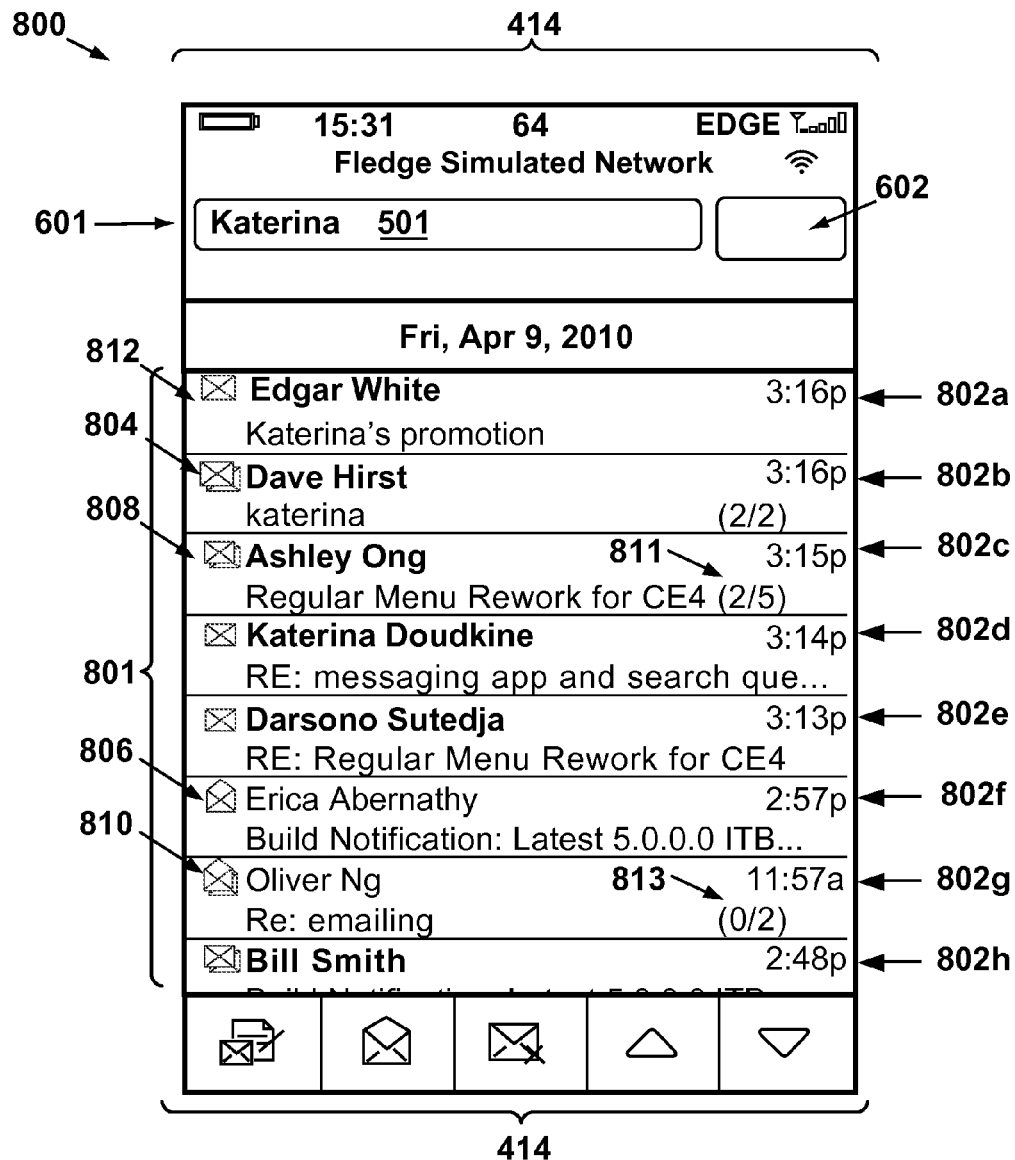
FIG. 8 depicts a representation of threaded search results in the portable electronic device of FIG. 1, according to non-limiting implementations.

Consider now implementations where a search has been performed prior to receiving additional message data 503 and search results 540 are being provided in search results screen as in FIG. 8. In these implementations, in response to receiving additional message data 503 that meets search criteria 501, search results 540 are automatically updated and the search results screen as in FIG. 8 is automatically updated. For example, device 101 can be operating in an environment where additional message data 503 is pushed to device 101, for example from a message server; in these implementations, when additional message data 503 that meets search criteria 501 arrives at device 101, search results 540 are automatically updated.

In some implementations, all the messages in each thread are provided (e.g. at least one further set of message data 102 associated with a given thread, for example the thread associated with the additional message data 503). However, in other implementations, only message data that meet the search results are provided in a given thread, regardless of whether each set of message data 102 in each respective thread is associated with search results 540.

In implementations depicted in FIG. 8, representation 800 further comprises respective graphic icons 804, 806, 808, 810, 812 for each of the threads in search results 540, each respective graphic icon 804, 806, 808, 810, 812 indicative of whether an associated thread comprises one message or a plurality of messages. For example, icons 806 and 812 include a representation of single envelope, open and closed respectively, indicative that there is only one message in each respective thread (and respectively whether or not the respective message has been opened or not opened). Similarly, icons 804, 808 and 810 comprise a representation of two envelopes, indicative that there are a plurality of messages in each respective thread. As icons 804 and 808 (which are similar to each other) each comprise closed envelopes, icons 804 and 808 indicate that there is at least one message in each thread that has not been opened. Similarly, as icon 810 comprises open envelopes, icon 810 indicates that all messages in the respective thread have been opened.

In further implementations, representation 800 can comprise respective textual indicators for the threads in search results 540, similar to indicator 811, each respective textual indicator indicative of a total number of messages in a respective thread and at least one of a number of unopened messages and a number of messages associated with search results 540. For example, indicator 811 of field 802c, indicates that there are 5 messages in the associated thread, 2 of which are unopened (e.g. "⅖"). Furthermore, indicator 813 of field 802h, indicates there are 2 messages in the associated thread, all of which have been opened (e.g. "0/2"). In depicted implementations, such textual indicators are provided only for threads comprising 2 or more messages. However in other implementations, such textual indicators can be provided for all threads.

Figure 9:
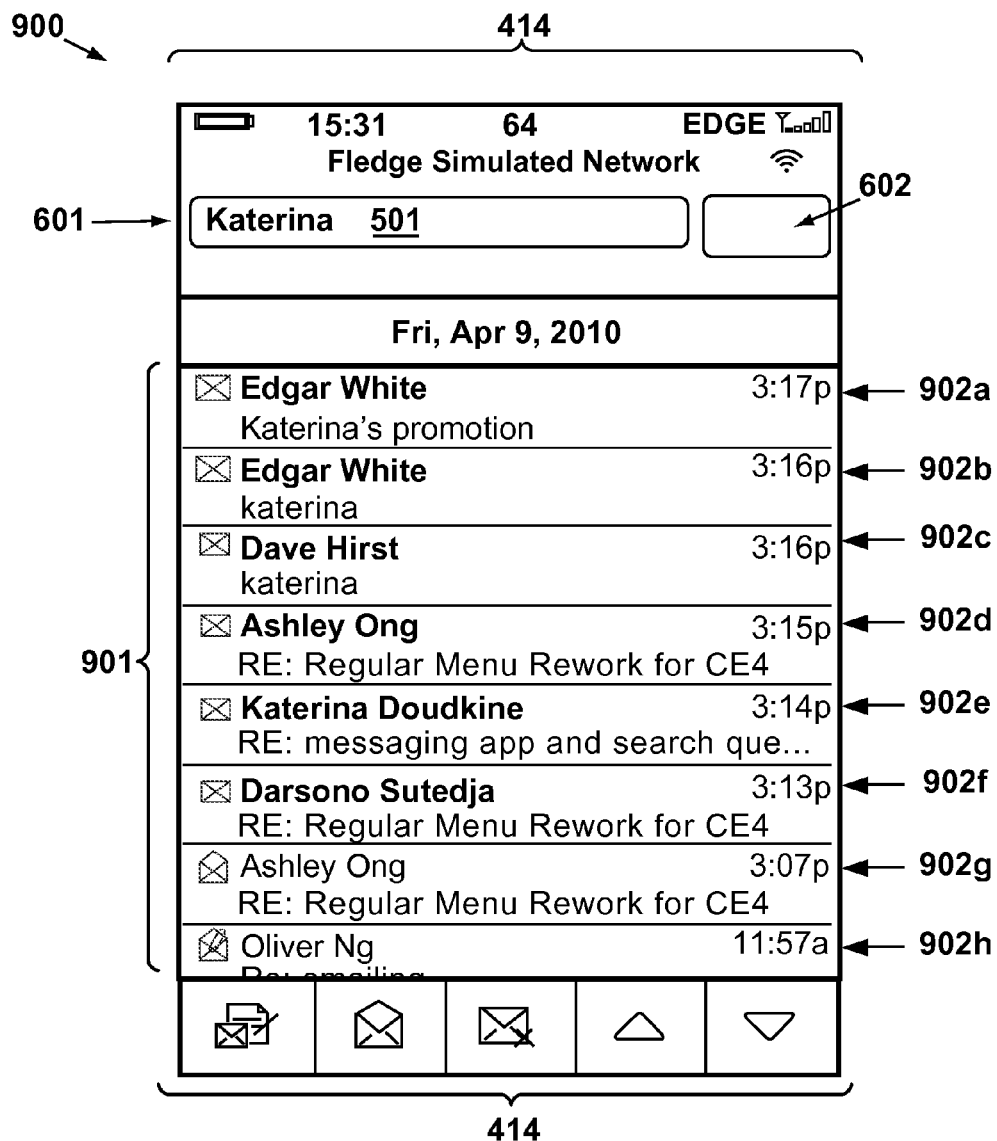
FIG. 9 depicts a representation of non-threaded search results in the portable electronic device of FIG. 1, according to non-limiting implementations.

In contrast to FIG. 8, FIG. 9 depicts an implementation in which search results 901 (similar to search results 801) are not arranged in threads, but rather each field 902a, 902b, 902c, 902d, 902e, 902f, 902g, 902h in search results 901 represent an individual search result arranged in a unified message inbox. FIG. 9 is otherwise similar to FIG. 8 with like elements having like numbers. However, as search results 901 are not arranged in threads, it is impossible to know how many messages associated with a thread might meet search criteria 501, and consequently might be in search results 540. For example, it is appreciated that messages in fields 902d, 902f, and 902g all belong to the same thread of field 802c of FIG. 8. However it is further appreciated from field 802c of FIG. 8 that there are 5 messages in this thread, and they are hence easy to access. From representation 900, it is impossible to know there are 5 messages in the thread, and further impossible to know whether they are in search results 540. Rather, the message list must be scrolled using suitable icons 414, which causes data to be needlessly and repeatedly compiled by processor 122 and transmitted to and stored in cache 227, in order to cause circuitry 129 to be controlled to provide search results that might be lower down the list in representation 900. This causes the processor to run slower as the new data is compiled, interfering with any other application that may be running on device 101 (including but not limited to application 136: in other words, processing of messages can become slower).

In any event, by initiating a search of index 130, and searching additional message data 503 that arrives at device 101 during the search, and by further providing search results in a thread, both searching and provision of search results becomes more efficient, as does organization of cached 227, which in turn speeds up device 101. Indeed, such a solution, while not specific to portable electronic devices, is particularly applicant to portable electronic devices due to their limited screen size and processing capabilities.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method comprising
initiating, at a processor of a device, a search of an index comprising keywords extracted from message data of a threaded inbox;
searching additional message data belonging to a given thread of the threaded inbox, in addition to the index, the additional message data received, via a communication interface of the device, while the search is being performed;
providing, at a display of the device, search results in threads, the search results automatically updated when the additional message data is received and meets search criteria of the search,
wherein the search is initiated subsequent to receipt of a search criteria character; and,
providing search options at the display when receiving the search criteria, the search options comprising options for searching given fields of the message data and wherein the search results comprise only data that meets the search criteria in chosen fields of the message data.

2. The method of claim 1, wherein the providing the search results comprises providing the additional message data in the given thread.

3. The method of claim 2, wherein the given thread further comprises at least one further set of message data associated with the given thread.

4. The method of claim 1, wherein each of the threads in the search results comprise only the message data associated with the search results.

5. The method of claim 1, wherein each of the threads in the search results comprise all message data associated with each respective thread, regardless of whether each message in each respective thread is associated with the search results.

6. The method of claim 1, further comprising providing respective graphic icons for each of the threads in the search results, each of the respective graphic icons indicative of whether an associated thread comprises one message or a plurality of messages.

7. The method of claim 1, further comprising providing respective textual indicators for each of the threads in the search results, each of the respective textual indicators indicative of a total number of messages in each respective thread and at least one of a number of unopened messages and a number of messages associated in each respective thread.

8. A device for searching message data, comprising
a processor, a display, and a communication interface, the processor configured to:
initiate a search of an index comprising keywords extracted from message data of a threaded inbox;
search additional message data belonging to a given thread of the threaded inbox, in addition to the index, the additional message data received, via the communication interface, while the search is being performed;

provide, at the display, search results in threads, the search results automatically updated when the additional message data is received and meets search criteria of the search, wherein the search is initiated subsequent to receipt of a search criteria character; and, provide search options at the display when receiving the search criteria, the search options comprising options for searching given fields of the message data and wherein the search results comprise only data that meets the search criteria in chosen fields of the message data.

9. The device of claim 8, wherein the processor is further configured to provide the search results by providing the additional message data in the given thread.

10. The method of claim 9, wherein the given thread further comprises at least one further set of message data associated with the given thread.

11. The device of claim 8, wherein each of the threads in the search results comprise only the message data associated with the search results.

12. The device of claim 8, wherein each of the threads in the search results comprise all message data associated with each respective thread, regardless of whether each message in each respective thread is associated with the search results.

13. The device of claim 8, wherein the processor is further configured to provide respective graphic icons for each of the threads in the search results, each of the respective graphic icons indicative of whether an associated thread comprises one message or a plurality of messages.

14. The device of claim 8, wherein the processor is further configured to provide respective textual indicators for each of the threads in the search results, each of the respective textual indicators indicative of a total number of messages in each respective thread and at least one of a number of unopened messages and a number of messages associated in each respective thread.

15. A computer program product, comprising a non-transitory computer usable medium having a computer readable program code adapted to be executed to implement a method for searching message data in a device comprising a processor interconnected with a memory, a display and a communication interface, comprising initiating, at a processor of a device, a search of an index comprising keywords extracted from message data of a threaded inbox;

searching additional message data belonging to a given thread of the threaded inbox, in addition to the index, the additional message data received, via a communication interface of the device, while the search is being performed;

providing, at a display of the device, search results in threads, the search results automatically updated when the additional message data is received and meets search criteria of the search, wherein the search is initiated subsequent to receipt of a search criteria character; and, providing search options at the display when receiving the search criteria, the search options comprising options for searching given fields of the message data and wherein the search results comprise only data that meets the search criteria in chosen fields of the message data.

* * * * *